(12) United States Patent
Seddon et al.

(10) Patent No.: US 11,065,577 B2
(45) Date of Patent: Jul. 20, 2021

(54) PROCESS FOR THE PRODUCTION OF COPPER SULFIDE

(71) Applicant: Petroliam Nasional Berhad (Petronas), Kuala Lumpur (MY)

(72) Inventors: Kenneth Seddon, Antrim (GB); Geetha Srinivasan, Antrim (GB); Mohammad Syamzari Rafeen, Kuala Lumpur (MY); Kuah Yong Cheun, Kuala Lumpur (MY); Amiruddin Hassan, Kuala Lumpur (MY); Adi Aizat Razali, Kuala Lumpur (MY); Sharizal Bin Mohd Azam Shah Wong, Kuala Lumpur (MY)

(73) Assignee: Petroliam Nasional Berhad (Petronas), Kuala Lumpur (MY)

( * ) Notice: Subject to any disclaimer, the term of this patent is extended or adjusted under 35 U.S.C. 154(b) by 0 days.

(21) Appl. No.: 16/635,618

(22) PCT Filed: Aug. 1, 2018

(86) PCT No.: PCT/EP2018/070891
§ 371 (c)(1),
(2) Date: Jan. 31, 2020

(87) PCT Pub. No.: WO2019/025500
PCT Pub. Date: Feb. 7, 2019

(65) Prior Publication Data
US 2020/0238214 A1 Jul. 30, 2020

(30) Foreign Application Priority Data
Aug. 1, 2017 (MY) .............................. PI2017001134

(51) Int. Cl.
*B01D 53/64* (2006.01)
*B01J 20/32* (2006.01)
*B01J 20/02* (2006.01)

(52) U.S. Cl.
CPC .......... *B01D 53/64* (2013.01); *B01J 20/3204* (2013.01); *B01D 2253/104* (2013.01); *B01D 2253/1128* (2013.01); *B01D 2253/306* (2013.01); *B01D 2256/24* (2013.01); *B01D 2257/602* (2013.01); *B01J 20/0237* (2013.01); *B01J 20/3236* (2013.01)

(58) Field of Classification Search
CPC .............. B01J 20/3085; B01J 20/0237; B01J 20/3236; B01J 20/0285; B01D 2257/602; B01D 2253/1128; B01D 2256/24; C01G 3/12; C10L 3/102; C10L 1/1275; C10L 2290/54; C10G 25/60; C10G 25/003; C10G 29/10; C10G 70/004; C10N 2060/10
See application file for complete search history.

(56) References Cited

U.S. PATENT DOCUMENTS

| | | | |
|---|---|---|---|
| 4,094,777 A * | 6/1978 | Sugier | B01D 15/00 210/670 |
| 7,645,306 B2 | 1/2010 | Kanazirev | |
| 8,268,744 B2 | 9/2012 | Wang | |
| 8,969,240 B2 | 3/2015 | Hetherington et al. | |
| 2007/0119300 A1 | 5/2007 | Yang et al. | |
| 2015/0060729 A1 | 3/2015 | Cousins et al. | |
| 2015/0182911 A1* | 7/2015 | Fish | C01B 3/56 423/210 |
| 2018/0169609 A1* | 6/2018 | Evans | B01J 20/0237 |

FOREIGN PATENT DOCUMENTS

| | | |
|---|---|---|
| WO | 2009101429 A1 | 8/2009 |
| WO | 2013136046 A1 | 9/2013 |

OTHER PUBLICATIONS

International Search Report dated Sep. 21, 2018 for App No. PCT/EP2018/070891.
Liao X-H et al: "A microwave assisted heating method for the preparation of copper sulfide nanorods", Journal of Crystal GR, Elsevier, Amsterdam, NL, vol. 252, No. 4, May 1, 2003 (May 1, 2003), pp. 593-598.
Raja Jadhav: "Development and Evaluation of Nanoscale Sorbents for Mercury Capture from Warm Fuel Gas", Aug. 25, 2006 (Aug. 25, 2006).
Roy et al: "Low-temperature synthesis of CuS Nanorods by simple wet chemical method", Materials LET, Elsevier, Amsterdam, NL, vol. 61, No. 8-9, Mar. 12, 2007 (Mar. 12, 2007), pp. 1693-1697.
Zhang Y C et al: "A simple hydrothermal route to nanocrystalline CuS", Journal of Crystal GR, Elsevier, Amsterdam, NL, vol. 268, Jul. 15, 2004 (Jul. 15, 2004), pp. 64-70.
Al-Miao Qin et al: "Formation of Various Morphologies of Covellite Copper Sulfide Submicron Crystals by Hydrothermal Method Without Surfactant", Crystal Growth & Design, vol. 5, No. 3, May 1, 2005, pp. 855-860.
N.S. Bloom; "Analysis and stability of mercury speciation in petroleum hydrocarbons"; Fresenius J Anal Chem, 2000, vol. 366, pp. 438-443.
Search Report dated Jun. 30, 2020 for Malaysian App. No. PI 2017001134.

* cited by examiner

*Primary Examiner* — Timothy C Vanoy
(74) *Attorney, Agent, or Firm* — Ryan T. Grace; Advent, LLP

(57) ABSTRACT

A process for preparing a copper sulfide of the formula $Cu_xS_y$, wherein the process comprises the following steps: (i) reacting an aqueous solution of a copper salt with a molar excess of a sulfiding agent so as to precipitate copper sulfide from the solution; (ii) isolating the copper sulfide precipitate from the reaction mixture; and (iii) drying the copper sulfide precipitate at a temperature of less than 100° C., wherein x and y are integer or non-integer values.

27 Claims, 10 Drawing Sheets

PROCESS FOR THE PRODUCTION OF COPPER SULFIDE

The present invention relates to industrial sorbents. In particular, the present invention relates to new materials that find utility as industrial sorbents, and new processes for their preparation. The present invention also relates to processes for removing mercury from mercury-containing hydrocarbon fluid streams using said new materials, and to mercury removal sorbents containing the material.

Copper sulfides are a family of chemical compounds denoted by the general formula $Cu_xS_y$, wherein x and y are either integer or non-integer values. Copper sulfides exist as naturally occurring minerals, and can also be produced synthetically. Irrespective of their source, copper sulfides vary widely in composition due to the varying stoichiometric ratios of copper and sulfur. Generally, the ratio of copper to sulfur in copper sulfide is $0.5 \leq Cu/S \leq 2$. Many non-stoichiometric copper sulfide compounds are known to exist. Examples of naturally occurring copper sulfide minerals include $CuS_2$ (villamaninite), CuS (covellite), $Cu_9S_8$ ($Cu_{1.12}S$) (yarrowite), $CU_{39}S_{28}$ ($Cu_{1.39}S$) (spionkopite), $Cu_8S_5$ ($Cu_{1.6}S$) (geerite), $Cu_7S_4$ ($Cu_{1.78}S$) (anilite), $Cu_9S_5$ ($Cu_{1.8}S$) (digenite), $Cu_{31}S_{16}$ ($Cu_{1.96}S$) (djurleite) and $Cu_2S$ (chalcocite). Previous investigations on the structure of covellite have indicated that there are other metastable Cu—S forms that have yet to be synthesized and characterized.

It is known to use copper sulfide in the chemical industry as a sorbent. A sorbent is a material used to absorb or adsorb liquids or gases. Sorbents generally have a large surface area to maximize the amount of sorbent material available to react with the species that it is designed to absorb or adsorb to. Sorbents have been used in industry to remove pollutants from fluid streams such as industrial process fluid streams, flue gas, and hydrocarbon streams such as crude oil, wet and dry natural gas. Sorbents have also been used to remove pollutants from water streams. In particular, atmospheric pollutants such as heavy metals can be removed from fluid streams. Heavy metals include substances such as mercury, cadmium, lead, arsenic, chromium, manganese, cobalt, nickel, copper zinc, selenium, silver, tin, antimony and thallium. Of particular interest for removal from fluid streams are mercury, cadmium, lead, arsenic and chromium due to their potential to harm the environment and their toxicity. Copper sulfide is known to be used as a sorbent for heavy metals. In particular, copper sulfide has been found to be useful as a mercury removal sorbent in removing mercury from fluid streams.

Liquid and gaseous hydrocarbons obtained from oil and gas fields are often contaminated with mercury. In particular, liquid and gaseous hydrocarbons obtained from oil and gas fields in and around the Netherlands, Germany, Canada, USA, Malaysia, Brunei and the UK are known to contain mercury. As reported by N. S. Bloom (Fresenius J. Anal. Chem., 2000, 366, 438-443), the mercury content of such hydrocarbons may take a variety of forms. Although elemental mercury tends to predominate, particulate mercury (i.e. mercury bound to particulate matter), organic mercury (e.g. dimethylmercury and diethylmercury) and ionic mercury (e.g. mercury dichloride) may also be found in naturally occurring hydrocarbon sources. The mercury concentration in crude oils can range from below 1 part per billion (ppb) to several thousand ppb depending on the well and location. Similarly, mercury concentrations in natural gas can range from below 1 $ng \cdot m^{-3}$ to greater than 1000 $\mu g \cdot m^{-3}$.

The presence of mercury in hydrocarbons is problematic due to its toxicity. In addition, mercury is corrosive towards hydrocarbon processing equipment, such as that used in oil and gas refineries. Mercury can react with aluminium components of hydrocarbon processing equipment to form an amalgam, which can lead to equipment failure. For example, pipeline welds, cryogenic components, aluminium heat exchangers and hydrogenation catalysts can all be damaged by hydrocarbons contaminated with mercury. This can lead to plant shutdown, with severe economic implications, or, in extreme cases, to uncontrolled loss of containment or complete plant failure, with potentially catastrophic results. Furthermore, products with high levels of mercury contamination are considered to be of poorer quality, with the result that they command a lower price.

A number of approaches to the removal of mercury from hydrocarbons have been proposed. These include: scrubbing techniques using fixed bed columns containing sulfur, transition metal or heavy metal sulfides and iodides on an activated support; oxidation followed by complexation with sulfur-containing compounds; and oxidation followed by solvent extraction. US2007/0119300 discloses a process for making sorbent particles adapted for the removal of pollutants from flue gas streams, wherein the process comprises mixing a solid metal salt with bentonite particles; mixing a sulfide salt with the bentonite particles and metal salt to form a metal sulfide on the surface of the bentonite particles before drying the sorbent particles. The metal salt and sulfide salt are mixed into the clay before they react to form the metal sulfide salt. The ingredients are mixed by way of a solid state grinding process or an incipient wetness process. The process also involves drying the clay at a temperature of 90° C. to 140° C. ° C.

US2015/0060729 discloses a process of producing a sulfided copper sorbent, wherein the process comprises the steps of (i) contacting a sorbent precursor material containing copper oxide, hydroxide, carbonate or hydroxycarbonates with a hydrogen sulfide gas stream to form a copper sulfide containing sorbent material, before heating the sulfided sorbent to a temperature above 110° C. The sorbent precursor comprises a copper impregnated support material selected from alumina, hydrated alumina, metal-aluminate, silica, titania, zirconia, zinc oxide, aluminosilicates, zeolites, or a mixture thereof. The sorbent precursor does not contain clay. The sorbent is taught as being useful for removal of mercury from gaseous and liquid industrial process fluids.

U.S. Pat. No. 7,645,306 discloses processes for purifying natural gas containing both mercury and sulfur contaminants by passing the natural gas through an absorbent bed comprising a sorbent comprising a metal oxide on a support. The metal oxide can be copper oxide. Copper sulfide is hence formed in situ in a reaction between the copper oxide sorbent and the mercury and sulfur pollutants. The copper oxide sorbent contains a support material such as carbon, activated carbon, coke, silica, aluminas, silica-aluminas, silicates, aluminates and silico-aluminates such as zeolites.

U.S. Pat. No. 8,969,240 discloses a sorbent suitable for removing heavy metals from fluid streams containing a reductant comprising 20 to 40% by weight of a particulate reduced copper sulfide, 30% to 75% by weight of a particulate support material and one or more binders selected from the group consisting of clay binders, cement binders, organic polymer binders, and a mixture thereof. The support material can comprise alumina, titania, zirconia, alumina-silicate, metal aluminate, hydrated metal oxide, mixed metal oxide, cement, zeolite or ceramic materials. The copper sulfide sorbent is made by reacting a copper salt that is a hydroxide, oxide, carbonate, or hydroxycarbonates with a hydrogen sulfide sulfiding agent. Before use, the copper sulfide sorbent is reduced in the presence of hydrogen gas at a temperature of from 150 to 350° C.

U.S. Pat. No. 8,268,744 discloses methods of manufacturing a mercury sorbent material comprising: making a copper/clay mixture by mixing a dry clay and a dry copper source; making a sulfur/clay mixture by admixing a dry clay and a dry sulfur source; admixing the copper/clay and sulfur/clay mixtures to form a mercury sorbent premixture; before shearing the premixture to form a sorbent material. The preferred copper source is copper sulphate. The sheared mixture is oven dried at a temperature of from 70 to 100° C. The sorbent is intended to be used to remove mercury from natural gas and industrial smoke stacks.

Despite the above copper sulfide sorbents being known and intended to be used to remove mercury from various gaseous and liquid fluids, problems can arise in that mercury breakthrough occurs once the sorbents have been used for a certain amount of time. The sorbents effectively become saturated with the mercury that they have removed from the mercury containing fluid feed and lose their ability to remove further mercury therefrom. Depending on the particular sorbent, the sorbent may have to be replaced with new sorbent material, or chemically treated so as to regenerate the original sorbent. Thus, many mercury removal sorbents containing copper sulfide that are currently known have a certain lifespan that, if possible, it would be advantageous to prolong.

The inventors of the present invention have appreciated that the ability of a copper sulfide sorbent to remove mercury from a fluid feed is related to the chemical formula of the copper sulfide and the specific structure of the material. Furthermore, appreciating that there are likely forms of copper sulfide that have not yet been synthesized and characterized, the inventors have appreciated the need for novel forms of copper sulfide that could potentially be used as industrial sorbents, such as in the removal of heavy metals such as mercury, cadmium, lead, arsenic and chromium from industrial process fluids and hydrocarbons such as natural gas.

According to an aspect of the invention, there is provided a process for preparing a copper sulfide of the formula $Cu_xS_y$, wherein the process comprises the following steps:
(i) reacting an aqueous solution of a copper salt with a molar excess of a sulfiding agent so as to precipitate copper sulfide from the solution;
(ii) isolating the copper sulfide precipitate from the reaction mixture; and
(iii) drying the copper sulfide precipitate at a temperature of less than 100° C.,
wherein x and y are integer or non-integer values.

Preferably, the sulfiding agent comprises ammonium sulfide, an alkali metal sulfide such as sodium sulfide, and hydrogen sulfide gas, or mixtures thereof. Most preferably, the sulfiding agent comprises ammonium sulfide.

Preferably, step (iii) of drying the copper sulfide precipitate comprises drying the precipitate in air at a temperature of less than 60° C., or drying the precipitate in vacuum at a temperature of less than 90° C.

According to a further aspect of the invention, there is provided copper sulfide obtained or obtainable by the process of the invention.

According to a further aspect of the invention, there is provided use of copper sulfide obtained or obtainable by the process of the invention as a sorbent. Preferably, use according to the invention comprises using the copper sulfide as a sorbent to remove heavy metals such as mercury from a fluid stream. Preferably, the fluid stream comprises a hydrocarbon containing fluid stream such as crude oil, wet natural gas, dry natural gas and other hydrocarbon streams such as liquid hydrocarbon streams. Most preferably, use according to the invention comprises using the copper sulfide as a sorbent for removing mercury from wet natural gas.

According to a further aspect of the invention, there is provided a process for the removal of mercury from a mercury-containing hydrocarbon fluid stream comprising the steps of:
(i) contacting the mercury-containing hydrocarbon fluid stream with a sorbent comprising copper sulfide of the formula $Cu_xS_y$, wherein x and y are integer or non-integer values; and
(ii) separating a fluid product from the sorbent, wherein the fluid product has a reduced mercury content compared to the mercury-containing hydrocarbon fluid stream;
wherein the copper sulfide is obtained or obtainable by a process comprising the following steps:
(a) reacting an aqueous solution of a copper salt with a molar excess of a sulfiding agent so as to precipitate copper sulfide from the solution;
(b) isolating the copper sulfide precipitate from the reaction mixture; and
(c) drying the copper sulfide precipitate at a temperature of less than 100° C.

Preferably, the copper sulfide is obtained or obtainable by the preferable process steps discussed above for the process of preparing copper sulfide according to the present invention.

According to another aspect of the invention, there is provided a mercury removal sorbent comprising copper sulfide obtained or obtainable by a process comprising the following steps:
(a) reacting an aqueous solution of chloride copper salt with a molar excess of a sulfiding agent so as to precipitate copper sulfide from the solution;
(b) isolating the copper sulfide precipitate from the reaction mixture; and
(c) drying the copper sulfide precipitate at a temperature of less than 100° C.

Preferably, the copper sulfide is obtained or obtainable by the preferable process steps discussed above for the process of preparing copper sulfide according to the present invention.

According to another aspect of the invention, there is provided the use of a mercury removal sorbent of the invention, for removing mercury from a mercury-containing fluid stream.

The following figures are referred to in more detail in the examples below.

Figure 14:
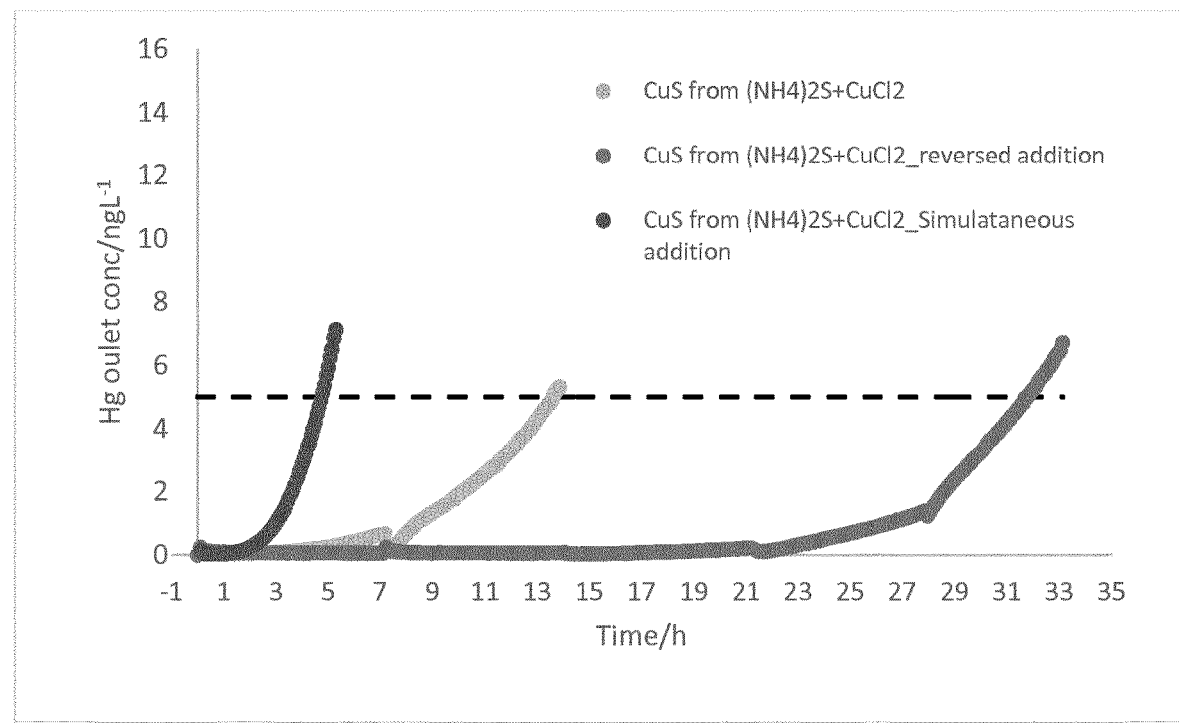

FIG. 14 is a graph showing the difference in mercury breakthrough time between various copper sulfides produced according to the process of the present invention. The graph compares mercury breakthrough for copper sulfide produced from a process where copper chloride solution is added to a flask containing ammonium sulfide solution with copper sulfide produced from a process where the ammonium sulfide solution is added to a flask containing copper chloride solution. The graph also shows mercury breakthrough for copper sulfide obtained via a process of the invention where a copper chloride solution is simultaneous added to an ammonium sulfide solution.

The copper salt is typically a copper salt that is soluble in water. For example, the copper salt can be a copper halide, nitrate, sulphate, thiocyanate or alkanoate such as copper acetate. Preferably, the copper salt is a copper halide salt. More preferably, the copper salt is copper (II) chloride. The copper salt used in the process of the present invention can be obtained from any suitable source. For example, copper (II) chloride can be obtained commercially from Sigma Aldrich. The copper salt such as the copper (II) chloride is reacted as an aqueous solution with the sulfiding agent. The concentration of the copper salt in the aqueous solution can be any suitable concentration for completion of the reaction. Typically, the aqueous solution of the copper salt has a concentration of from 0.1 M to 5 M, preferably from 0.5 M to 2M and most preferably about 1M.

The sulfiding agent can be any suitable sulfiding agent known to be able to react with the solution of the copper salt to form copper sulfide. The term sulfiding agent as used herein refers to a compound that can react with the copper ions in the solution by acting as a source of sulfur atoms or ions so as to form the copper sulfide. The sulfiding agent may comprise alkali metal sulfides or polysulfides, alkali earth metal sulfides or polysulfides, ammonium sulfides or polysulfides, hydrogen sulfide and disulfide, or mixtures thereof. Examples of sulfiding agents include sodium sulfide, sodium disulfide, sodium polysulfide, potassium sulfide, potassium disulfide and potassium polysulfide, aluminium sulfide, magnesium sulfide, thiobenzoic acid, or mixtures thereof. Preferably, the sulfiding agent comprises an alkali metal sulfide, ammonium sulfide, hydrogen sulfide, or mixtures thereof. More preferably, the sulfiding agent comprises sodium sulfide, ammonium sulfide, hydrogen sulfide, or mixtures thereof. Most preferably, the sulfiding agent comprises ammonium sulfide.

Preferably, the sulfiding agent is also in solution. When the sulfiding agent is a soluble salt such as an alkali or alkali earth metal salt (e.g. sodium sulfide) or ammonium sulfide, the sulfiding agent is preferably in an aqueous solution. The sulfiding agent is typically present in the aqueous solution in an amount of from 8 to 50 weight percent, preferably from 25 to 50 weight percent, and most preferably about 50 weight percent.

The aqueous solution of the copper salt and the aqueous solution of the sulfiding agent comprise water. The water can be from any suitable source such as tap water, deionised water, brine, or any other suitable source of water. The solutions preferably only comprise the copper (II) chloride or sulfiding agent and water. However, solutions comprising other components may also be used (for example minor amounts of other dissolved salts such as sodium chloride).

When the sulfiding agent is a compound dissolved in aqueous solution such as sodium sulfide or ammonium sulfide, step (i) of reacting the aqueous solution of copper salt and aqueous solution of sulfiding agent may comprise adding the solution of sulfiding agent to a flask containing the copper salt solution. For example, an aqueous solution of sulfiding agent can be added to a flask containing the copper salt solution through a septum via a syringe and needle. Optionally, the system is connected to a guard bed such as a zinc oxide guard bed to trap any hydrogen sulfide and hydrogen chloride released as by-products of the reaction. The use of such a guard bed in such a system as described above is familiar to the person skilled in the art.

Alternatively, the step of reacting the aqueous solution of copper salt with the sulfiding agent may comprise adding the solution of the copper salt into a solution of the sulfiding agent. For example, the step may comprise adding a solution of a copper halide such as copper (II) chloride to an aqueous solution of an ammonium sulfide, alkali metal sulfide or alkali earth metal halide. In an embodiment, the reacting step comprises adding an aqueous solution of copper (II) chloride to an aqueous solution of ammonium sulfide. As discussed in more detail below, copper sulfide produced by the process of the present invention has been found to have an enhanced mercury removal ability. Surprisingly, and without being limited by theory, it has been found that when a solution of the copper salt such as copper (II) chloride is added to a solution of the sulfiding agent such as ammonium sulfide, the time taken until mercury breakthrough is longer (i.e. improved mercury removal ability) than when an aqueous solution of the sulfiding agent (such as ammonium sulfide) is added to the aqueous solution of the copper salt such as copper (II) chloride. For example, when copper (II) chloride solution is added into a flask containing ammonium sulfide, it has been found that the mercury breakthrough time of the copper sulfide formed from such a process is more than two times the mercury breakthrough time of copper sulfide formed from a process where ammonium sulfide is added into a flask containing copper (II) chloride. The sequence of addition of the two reagents to one another has thus been found to have an impact upon the properties of the copper sulfide formed from such a process, such as the ability of the copper sulfide to remove mercury from hydrocarbon fluid streams.

Thus, in a particularly advantageous embodiment, the process of reacting the aqueous solution of copper salt with the sulfiding agent comprises adding an aqueous solution of the copper salt such as copper (II) chloride into a flask of the aqueous solution of the sulfiding agent such as ammonium sulfide.

Preferably, step (i) of reacting the aqueous solution of copper salt and aqueous solution of sulfiding agent comprises stirring the reaction mixture for a time period of from 10 minutes to 30 minutes. During the mixture and reaction of the two solutions, copper sulfide is precipitated from the solution as a black precipitate.

After the reaction, the mixture is preferably left to stand for a time period of from 5 minutes to 60 minutes.

When the sulfiding agent is a gas such as hydrogen sulfide, the sulfiding agent is not reacted with the copper salt solution as an aqueous solution but by a means suitable for reacting gases with a compound dissolved in an aqueous solution. Such means are known by the person skilled in the art. For example, hydrogen sulfide gas in nitrogen can be bubbled through the copper salt solution for a sufficient time for the hydrogen sulfide to react with the copper ions in solution and yield the black copper sulfide precipitate. For example, hydrogen sulfide gas in nitrogen can be bubbled through the copper (II) chloride solution for a time period of from 25 to 65 hours, preferably 40 to 50 hours, and most preferably about 45 hours. The concentration of the hydrogen sulfide in the nitrogen can be, for example, 50 ppm to 250 ppm, preferably 75 ppm to 125 ppm and most preferably about 100 ppm.

The sulfiding agent is reacted with the copper salt in a molar excess. In the process of the invention, the copper salt used is contacted with a greater amount of moles of sulfiding agent. Preferably, for every one mole of the copper salt present, the copper salt is contacted with from 1.1 to 1.5 moles of sulfiding agent, more preferably from 1.05 to 1.2 moles of sulfiding agent, and most preferably 1.1 moles of sulfiding agent.

The copper sulfide precipitate is then isolated from the reaction mixture by any suitable means known in the art. Such isolation means will be known to the person skilled in the art. Suitably, the copper sulfide precipitate is isolated by filtration with a suitably sized filter paper. In such a process, the reaction mixture is poured onto a filter paper such that the water and dissolved species pass through the filter paper whereas the copper sulfide precipitate does not. In such a way, the copper sulfide precipitate is isolated form the reaction mixture. Other species dissolved in the solution may include soluble by-products of the reaction and unreacted starting materials such as dissolved copper (II) chloride, ammonium sulfide, sodium sulfide etc. A suitable sized filter paper is one that the copper sulfide precipitate particles cannot pass through.

After filtration, the copper sulfide precipitate is preferably washed with deionised water to remove further impurities from the precipitate. This entails pouring deionised water onto the precipitate whilst it is on the filter paper such that the deionised water passes over the precipitate and through the filter paper dissolving any impurities as it goes and transporting them through the filter paper.

The copper sulfide precipitate is then dried for a time period of, typically, less than 48 hours, such as for a time period of from 1 hour to 48 hours. The drying can be carried out in air or in vacuum.

The drying is carried out at a temperature of less than 100° C. The drying can be carried out at a temperature of less than 90°, less than 80° C., less than 70° C., less than 60° C., less than 50° C., less than 40° C., or less than 30° C.

Preferably, the drying is carried out a temperature of more than 0° C. Preferably, the drying is carried out a temperature of less than 60° C. Most preferably, the drying is carried out a temperature of from 15° C. to 50° C.

When the drying of the precipitate is carried out in air, preferably, the drying is carried out at a temperature of less than 70° C., less than 60° C., less than 50° C., less than 40° C. or, or less than 30° C.

Most preferably, when the drying is carried out in air, the drying is carried out a temperature of less than 60° C. or less than 50° C.

When the drying of the precipitate is carried out under vacuum, preferably, the drying is carried out at a temperature of less than 100° C., less than 90° C., less than 80° C., less than 70° C., less than 60° C., less than 50° C., less than 40° C. or less than 30° C.

Most preferably, when the drying is carried out under vacuum, the drying is carried out at a temperature of less than 80° C. or less than 70° C.

Without being limited by theory, it is postulated that the temperature of the drying step is important to the process of the invention since the novel form of copper (II) sulfide produced by the process of the invention has been found to have enhanced mercury removal ability. This enhanced mercury removal ability is reduced when the copper (II) sulfide is dried above certain temperatures. This is postulated to be because the novel form of copper sulfide converts to a different form with decreased mercury removal ability above certain temperatures. It is believed that drying at a higher temperature under vacuum is possible whilst retaining good mercury removal ability compared with drying in the presence of air, since it is believed that the novel form of copper sulfide may at least partially oxidize in the presence of air to a form with decreased mercury removal ability.

It has been found that when copper sulfide is produced according to the process of the invention, the copper sulfide has an unexpected increased ability to remove mercury from a mercury-containing fluid streams compared to existing forms of copper sulfide, and copper sulfide manufactured by different processes. Copper sulfide prepared by the process of the invention has been found to have a previously uncharacterized and synthesized nanocrystalline form.

The copper sulfide of the invention is of the formula $Cu_xS_y$ and is a nanocrystalline form. Surprisingly, the exact nature of the nanocrystalline form has been found to vary depending upon the process used to synthesize it. Where an ammonium sulfide sulfiding agent is used, the nanocrystalline form of copper sulfide of the invention generally comprises needle shaped nanocrystalline structures with a length of generally from 100 nm to 200 nm, and a diameter of generally from 10 to 20 nm.

On the other hand, where the sulfiding agent is sodium sulfide or hydrogen sulfide, the nanocrystalline form of copper sulfide of the invention generally comprises oval shaped nanostructures.

Preferably, the copper sulfide according to the present invention comprises nanocrystalline needle like structures such as those discussed above. Preferably, the needle like nanocrystalline structures are formed when the copper sulfide according to the present invention is made via a process of the invention employing an ammonium sulfide sulfiding agent.

The nanocrystalline forms of copper sulfide according to the present invention have been found to have a higher mercury removal ability than known forms of copper sulfide. Of the nanocrystalline forms of copper sulfide according to the invention discussed above, it has been found that the nanocrystalline needle structures of copper sulfide prepared according to the process of the invention with an ammonium sulfide sulfiding agent have a higher mercury removal ability than the oval structure nanocrystalline forms of copper sulfide according to the invention prepared by the process of the invention using sodium sulfide and hydrogen sulfide as the sulfiding agent. Nevertheless, the oval nanostructures prepared from sodium sulfide and hydrogen sulfide sulfiding agents still have an enhanced mercury removal ability compared to forms of copper sulfide known in the art.

Without being limited by theory, it is postulated that the enhanced mercury removal ability of copper sulfide of the invention could be associated with the greater surface area of crystalline nanoparticles compared to known forms of copper sulfide that may have lower surface areas. This could be due to the higher surface area material having a greater amount of active sites that mercury can adsorb to thus removing it from a fluid stream. This theory would explain why it has been found that the nano-needle structures prepared when ammonium sulfide is the sulfiding agent have enhanced mercury removal ability than the oval nanostructures produced when sodium sulfide or hydrogen sulfide are sulfiding agent which have a lower surface area.

As discussed above, it has been found that the temperature of the drying step in the process of preparation is linked to the enhanced removal of the copper sulfide to remove mercury from fluid streams. This is postulated to be that above a certain temperature, the nanostructures agglomerate decreasing the surface area of the copper sulfide, decreasing the amount of active sites available for mercury. Above yet a higher temperature, the nanostructures may degrade into a different form of copper sulfide altogether such as microcrystalline copper sulfide.

It has been found that where copper sulfide is prepared according to the process of the invention using ammonium sulfide, sodium sulfide or hydrogen sulfide, the ability of the copper sulfide to remove mercury from a fluid feed decreases if the copper sulfide is dried at higher temperatures. It has also been found that the mercury removal ability of copper sulfide prepared according to the process of the invention has best mercury removal ability when prepared using ammonium sulfide, followed by sodium sulfide, followed by hydrogen sulfide.

Thus, most preferably, the temperature used during drying is low (such as below 60° C. or 50° C. in air, or below 80° C. or 70° C. in vacuum), and the sulfiding agent comprises ammonium sulfide, sodium sulfide or hydrogen sulfide. Most preferably, the sulfiding agent comprises ammonium sulfide.

The process of the present invention can be done in the presence or absence of a binder material or support material. In the manufacture of many sorbents, the active material (i.e. copper sulfide or other material that acts to absorb/adsorb) is often synthesized with binder or support material in the reaction mixture so as to produce sorbent particles that comprise a binder or support material with an adsorbent/absorbent material upon its surface. Examples of such support materials and binder materials commonly used include activated carbon, silicates, alumina, titanium, zirconia, alumina-silicate, metal aluminate, hydrated metal oxide, mixed metal oxide, metal carbonates, cement, zeolite, a ceramic material, clay, cement, polymers, or any combination thereof. It is preferred that the process of the present invention is carried out in the absence of any binders or support materials such as those discussed above present in the reaction mixture. However, in the alternative, the process of the invention may be carried out in the presence of one or more binders or support materials, such as those discussed above.

Sorbents of the present invention may comprise the copper sulfide of the invention and optionally one or more binder or support materials, such as those discussed above. Where the sorbents of the invention comprise one or more binder or one or more support materials, the copper sulfide of the invention may be synthesized initially before the dried copper sulfide is mixed with the support or binder to form a sorbent. In this scenario, it will be appreciated that the support or binder is not present when the process of the invention is carried out to produce the copper sulfide. As such, the one or more binders or support materials are not included in the reaction mixture of the process of the invention and the copper sulfide is dried in the absence of the binder or support material before being applied to or mixed with the one or more binders or support materials in a dry form to form a sorbent of the present invention. The copper sulfide produced by the process of the present invention has been found to reduce the mercury content of fluid streams flowing past the copper sulfide. Because of this, it is postulated that the copper sulfide of the invention could find utility in a wide variety of industrial applications as the active component of a sorbent. It is believed that the copper sulfide of the invention could find utility in removing environmental pollutants such as heavy metals from liquid or gaseous fluid streams. The term "heavy metals" as used herein typically refers to metals which may cause damage to the environment or human health when exposure occurs at high enough doses. Typically, the term "heavy metals" encompasses chromium, arsenic, cadmium, mercury and lead. However, the term may additionally be used to refer to manganese, cobalt, nickel, copper, zinc, selenium, silver, tin, antimony and thallium. Preferably, the copper sulfide of the present invention is used to remove mercury from fluid streams.

Use according to the present invention comprises using the copper sulfide of the invention to remove heavy metals such as mercury from fluid streams such as liquid or gaseous fluid streams. The fluid streams may comprise water streams, flue gas streams, industrial process streams such as industrial gas process streams, or hydrocarbon streams such as crude oil, wet natural gas and dry natural gas. In such uses, the copper sulfide acts as a sorbent. The sorbent comprising copper sulfide particles of the invention can comprise one or more support materials or one or more binder materials such as those discussed above. Alternatively, when used as a sorbent, the copper sulfide of the present invention may be unsupported and not be in the presence of one or more binder materials or one or more support materials.

Thus, according to a further aspect of the invention, there is provided a process for the removal of mercury from a mercury-containing hydrocarbon fluid stream comprising the steps of:

(iii) contacting the mercury-containing hydrocarbon fluid stream with a sorbent comprising copper sulfide of the formula $Cu_xS_y$, wherein x and y are integer or non-integer values; and (iv) separating a fluid product from the sorbent, wherein the fluid product has a reduced mercury content compared to the mercury-containing hydrocarbon fluid stream;

wherein the copper sulfide is obtained or obtainable by a process comprising the following steps:

(d) reacting an aqueous solution of copper salt with a molar excess of a sulfiding agent so as to precipitate copper sulfide from the solution;
(e) isolating the copper sulfide precipitate from the reaction mixture; and
(f) drying the copper sulfide precipitate at a temperature of less than 100° C.

Preferably, the copper sulfide is obtained or obtainable by the preferable process steps discussed above for the process of preparing copper sulfide according to the present invention.

Mercury-containing hydrocarbon fluids that can be processed according to the present invention may typically comprise from 1 part per billion (ppb) of mercury to 2000 parts per million (ppm) of mercury. For example, hydrocarbons fluids that can be processed can comprise 2 to 10,000 ppb of mercury; or 5 to 1000 ppb of mercury. The mercury content of naturally occurring hydrocarbon fluids may take a variety of forms, and the present invention can be applied to the removal of elemental mercury, particulate mercury, organic mercury or ionic mercury from hydrocarbon fluids. In one preferred embodiment, the mercury is in one or more of elemental, particulate or organic form. Still more preferably, the mercury is in elemental form.

The process of the invention may be applied to substantially any hydrocarbon fluid stream which comprises mercury, and which is liquid or gaseous under the operating conditions of the process. Thus, hydrocarbon fluid streams that may be processed according to the present invention include liquid hydrocarbons, such as liquefied natural gas; light distillates, e.g. comprising liquid petroleum gas, gasoline, and/or naphtha; natural gas condensates; middle distillates, e.g. comprising kerosene and/or diesel; heavy distillates, e.g. fuel oil; and crude oils. Hydrocarbon fluids that may be processed according to the present invention also include gaseous hydrocarbons, such as natural gas and refinery gas. Preferably the hydrocarbon fluid comprises natural gas, and most preferably, wet natural gas.

Generally, it is most economical to contact the copper sulfide sorbent and the mercury-containing hydrocarbon fluid feed without the application of heat, and refinery product streams may be conveniently treated at the temperature at which they emerge from the refinery, which is typically in the range of from −80° C. to 200° C. The copper sulfide sorbent and mercury-containing fluid feed can be contacted at any suitable pressure for the reaction to take place between the copper sulfide and the mercury in the hydrocarbon fluid stream, for example, atmospheric pressure.

In accordance with the process of the present invention, the copper sulfide sorbent extracts at least 60 wt % of the mercury content of the mercury-containing hydrocarbon fluid stream. More preferably, the copper sulfide sorbent extracts at least 70 wt %, still more preferably at least 80 wt %, still more preferably at least 90 wt %, still more preferably at least 95 wt %, and most preferably greater than 99 wt % of the mercury content of the mercury-containing hydrocarbon fluid stream.

Thus, in accordance with the process of the present invention, a hydrocarbon fluid product may be obtained which comprises 10% or less of the mercury content of the mercury-containing hydrocarbon fluid stream. More preferably the hydrocarbon fluid product comprises 5% or less of the mercury content of the mercury-containing hydrocarbon fluid stream, and most preferably the hydrocarbon fluid product comprises 1% or less of the mercury content of the mercury-containing hydrocarbon fluid stream.

Preferably the mercury concentration of the hydrocarbon fluid product of the process of the invention is less than 50 ppb, more preferably less than 10 ppb, and most preferably less than 5 ppb.

The copper sulfide sorbent and the mercury-containing hydrocarbon fluid stream may be contacted by either continuous processes or batch processes. Any conventional solid-liquid or solid-gas contactor apparatus may be used in accordance with the present invention.

The process of the invention may be repeated on the same mercury-containing hydrocarbon fluid feed in a series of contacting steps, e.g. two to ten, to obtain a successive reduction in the mercury content of the hydrocarbon fluid product at each step.

The copper sulfide sorbent is allowed to contact the mercury-containing hydrocarbon fluid stream for sufficient time to enable at least a portion of the mercury in the mercury-containing hydrocarbon fluid stream to adsorb or absorb to the sorbent comprising copper sulfide. Suitable timescales include from 1 second to 5 hours.

The copper sulfide sorbent according to the present invention, or used in the process of the present invention may be supported on one or more support materials, or may be in the presence of one or more binder materials, or may be in the presence of both one or more support materials and one or more binder materials. Alternatively, the copper sulfide sorbent used in the process of the present invention may be free of one or more support materials or one or more binder materials. The one or more binder materials or one or more support materials that the copper sulfide sorbent may comprise or be free of may be inert materials. The one or more binder materials or one or more support materials that the copper sulfide sorbent may comprise or be free of may comprise silicates, alumina, titanium, zirconia, alumina-silicate, metal aluminate, hydrated metal oxide, mixed metal oxide, metal carbonates, cement, zeolite, a ceramic material, clay, cement, polymers, or any combination thereof.

Accordingly, the copper sulfide sorbent according to the present invention, or used in the process of the present invention may contain only copper sulfide of the present invention, and be free of one or more binder materials and/or one or more support materials such as the materials discussed above.

The process of the present invention may be used in combination with other known methods for the removal of mercury from hydrocarbon fluids. However, the process of the invention may alternatively be sufficient to remove mercury from hydrocarbon fluid streams to a sufficient extent such that it is not necessary to use any other processes for mercury removal in combination.

According to another aspect of the invention, there is provided a mercury removal sorbent comprising copper sulfide obtained or obtainable by the process of the invention discussed above. The mercury removal sorbent comprising copper sulfide may comprise or may not comprise any of the features discussed above for the copper sulfide sorbent discussed above in the context of the process of the invention for removing mercury from mercury-containing hydrocarbon fluid streams.

EXAMPLE

The following examples are not to be considered as limiting the scope of the claims and are included merely to exemplify certain embodiments of the process of the present invention.

Step-By-Step Preparation of 5 g of the $Cu_xS_y$ Material Using $(NH_4)_2S$ as Sulfide Source Copper sulfide according to the invention was prepared by the following process:

Preparation of 5 g of copper sulfide requires 7.034 g $CuCl_2$ anhydrous & 7.823 g of $(NH_4)_2S$ (mol ratio 1:1.1 respectively) using an excess of $(NH4)_2S$.

1. Weigh 7.034 g of $CuCl_2$ anhydrous in 100 ml two necked round bottomed flask and make 1 M $CuCl_2$ solution in $H_2O$ by adding 52.3 ml of water into the flask.
2. Stir the solution until all $CuCl_2$ dissolved in $H_2O$ and a clear light blue solution is provided.
3. A previously weighed $(NH_4)_2S$ 50 wt % solution in $H_2O$ was added through a septum using a syringe and needle until all 7.823 g of $(NH_4)_2S$ in $H_2O$ was added completely while stirring maintained (through the other neck of the flask). The system was connected to a zinc-oxide guard-bed to trap any $H_2S$ released and the outlet released into a beaker of water to remove the hydrogen chloride.
4. The mixture in the flask was continuously stirred for 15 minutes using a stirrer bar (rigorous stirring is not needed since the reaction kinetics are fast). A black copper sulfide precipitate is then obtained in the solution.
5. The sample is left for aging for not more than an hour.
6. The solution was filtered using filter paper (5-13 μm size) and the filtered solids were then washed using de-ionized water until the filtrate solution turned from pale yellow to colourless (~1 g product washed using 100 ml $H_2O$). Washing removes excess $(NH_4)_2S$, $CuCl_2$ and any soluble by-products.
7. Filtered solid dried in air for no longer than 2 days.

$Cu_xS_y$ materials were also prepared using various sulfiding sources such as $Na_2S$ and $H_2S$. In the case of $Na_2S$, the preparation procedure was followed the same as for $(NH_4)_2S$ discussed above. When $H_2S$ was the sulfiding source, 100 ppm $H_2S$ gas in nitrogen was bubbled through 1 M $CuCl_2$ aqueous solution for 45 h resulting in 0.53 g of $Cu_xS_y$ material.

Mercury Extraction Studies

Figure 9:
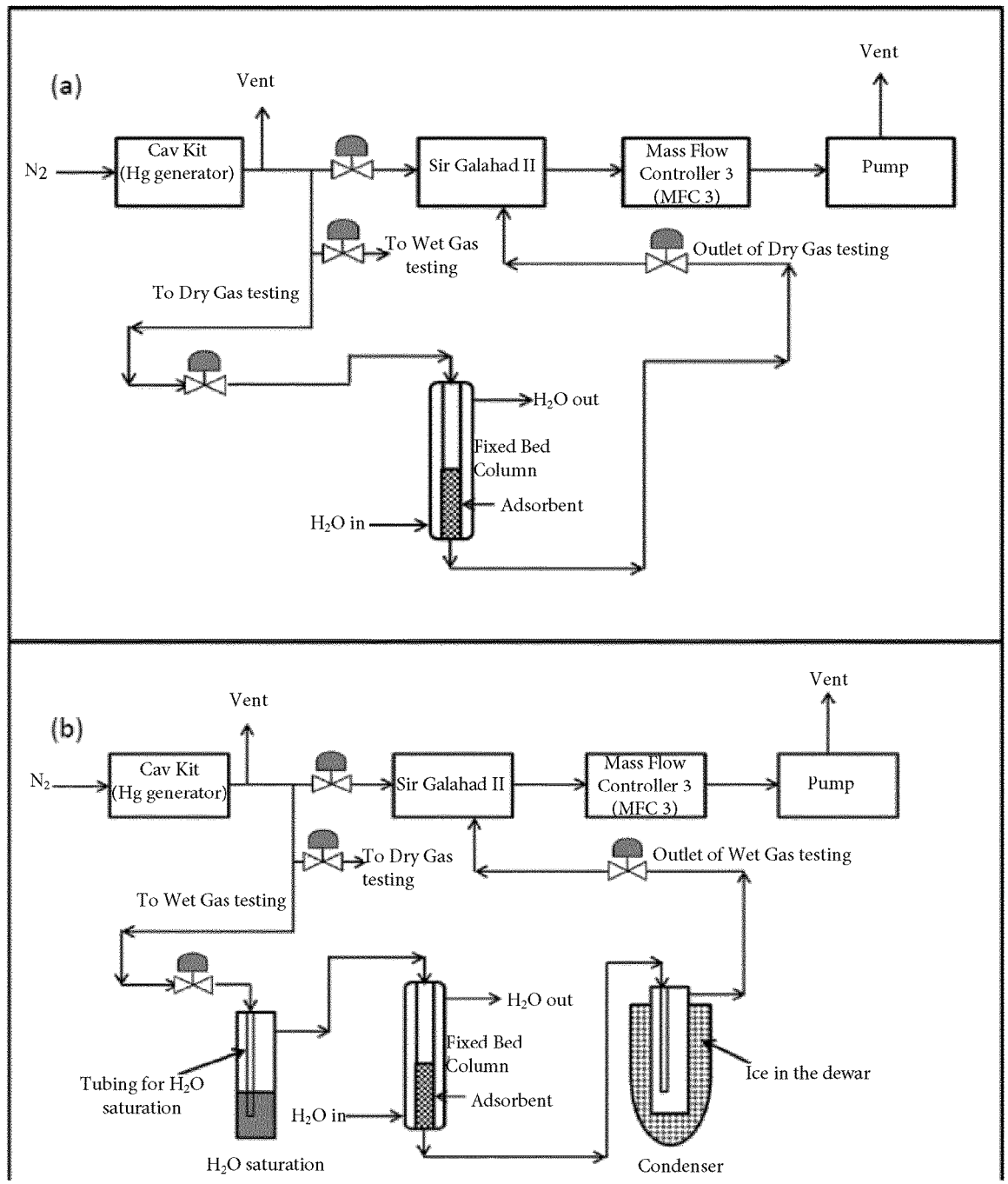
FIG. 9 is a diagram of a fixed bed reactor (dry gas test rig) used for various mercury extraction studies discussed herein. Diagram (a) relates to dry gas testing, and diagram (b) relates to wet-gas testing.

All mercury extraction experiments were carried out using nitrogen as carrier gas using the set-up shown in FIG. 9 (a) dry gas testing and (b) wet-gas testing. How to configure and use the apparatus for testing mercury extraction performance will be apparent to those of skill in the art.

Based on the preparation methodology explained in the example above, the $Cu_xS_y$ samples synthesized are listed below:

1. $Cu_xS_y$ (($NH_4)_2S+CuCl_2$) air ambient drying—SI—NH
2. $Cu_xS_y$ (($NH_4)_2S+CuCl_2$) air 90° C. drying—SII—NH
3. $Cu_xS_y$ (($NH_4)_2S+CuCl_2$) vacuum 90° C. drying—SIII—NH
4. $Cu_xS_y$ (($NH_4)_2S+CuCl_2$) air 90° C., vacuum 250° C. drying—SIV—NH
5. $Cu_xS_y$ (($NH_4)_2S+CuCl_2$) vacuum 90° C., vacuum 250° C. drying—SV—NH
6. $Cu_xS_y$ ($Na_2S+CuCl_2$) air ambient drying—SI—Na
7. $Cu_xS_y$ ($Na_2S+CuCl_2$) air 90° C. drying—SII—Na
8. $Cu_xS_y$ ($Na_2S+CuCl_2$) air 90° C., vacuum 250° C. drying—SIV—Na
9. $Cu_xS_y$ ($H_2S+CuCl_2$) air ambient drying—SI—H
10. $Cu_xS_y$ ($H_2S+CuCl_2$) air 90° C. drying—SII—H
11. $Cu_xS_y$ ($H_2S+CuCl_2$) air 90° C., vacuum 250° C. drying—SIV—H "Ambient temperature" as described above is 20° C.

Figure 1:
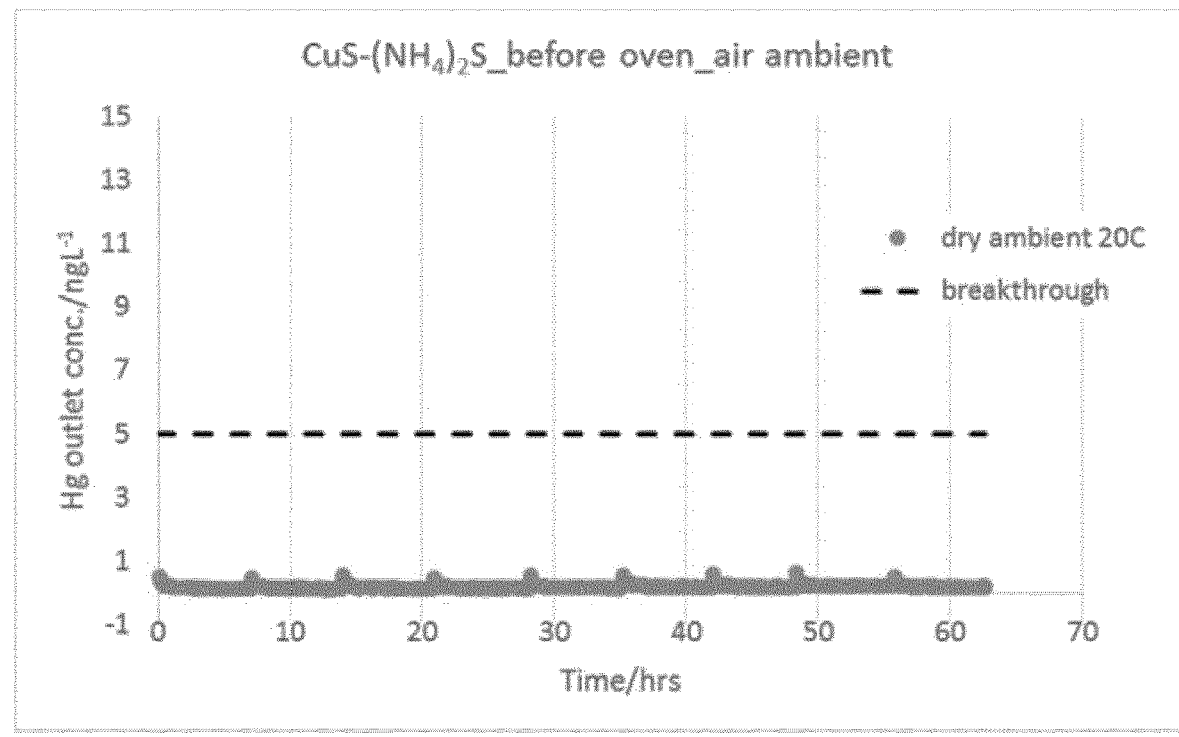
FIG. 1 is a graph of SI—NH sample Hg removal performance.

The breakthrough test was conducted with a flow rate of 600 ml/min, 2000 ng/L Hg & 0.03 g of sample weight using Sir Galahad II mercury analyzer. Mercury removal performance for SI—NH (air dried in ambient) possesses good extraction performance without indication of mercury breakthrough after more than 60 hours. The results are shown in FIG. 1.

Figure 2:
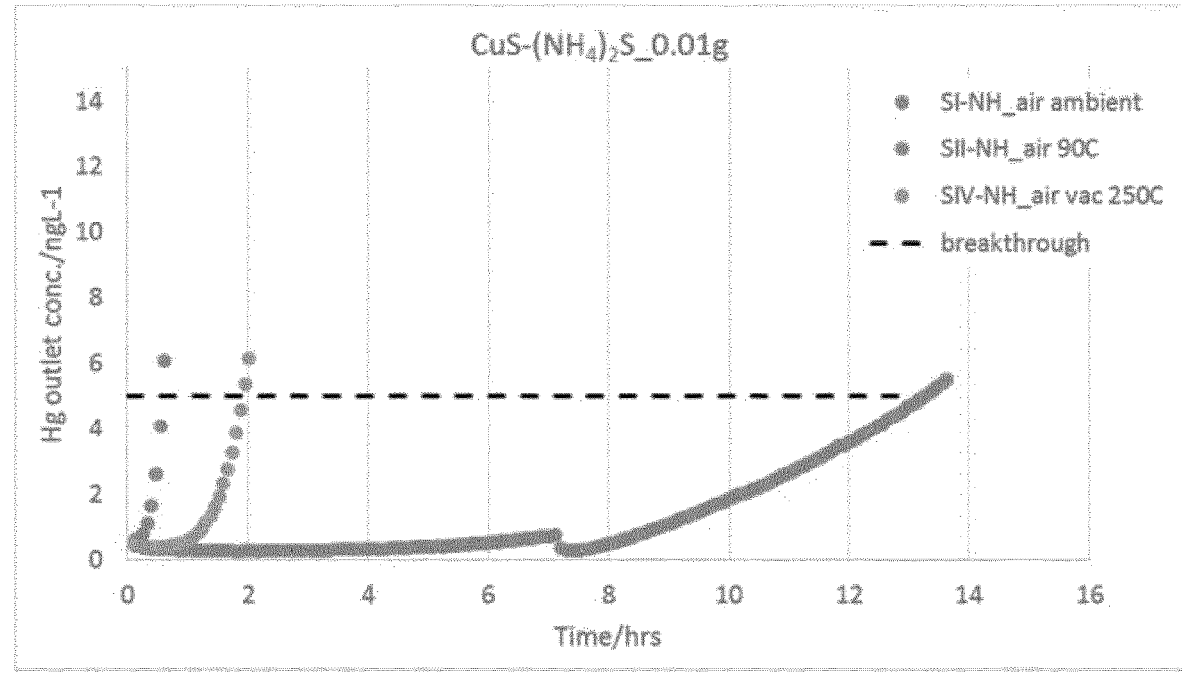
FIG. 2 is a graph of HG breakthrough plots for SI—NH, SII—NH & SIV—NH with reduced sample loading of 0.01 g.

This result is compared with various treated $Cu_xS_y$ materials SII—NH and SIV—NH as shown in FIG. 2. Since the breakthrough hours were very long, the testing conditions were modified to achieve mercury breakthrough and thereby also reproduce the extraction performance of SI—NH; sample size was reduced as 0.01 g to accelerate the breakthrough process. $Cu_xS_y$ materials were also prepared using various sulfiding sources. The mercury breakthrough plots for the $Cu_xS_y$ samples prepared from $(NH_4)_2S$, $Na_2S$ and $H_2S$ as sulfiding sources, are shown in FIGS. 2-5.

Figure 3:
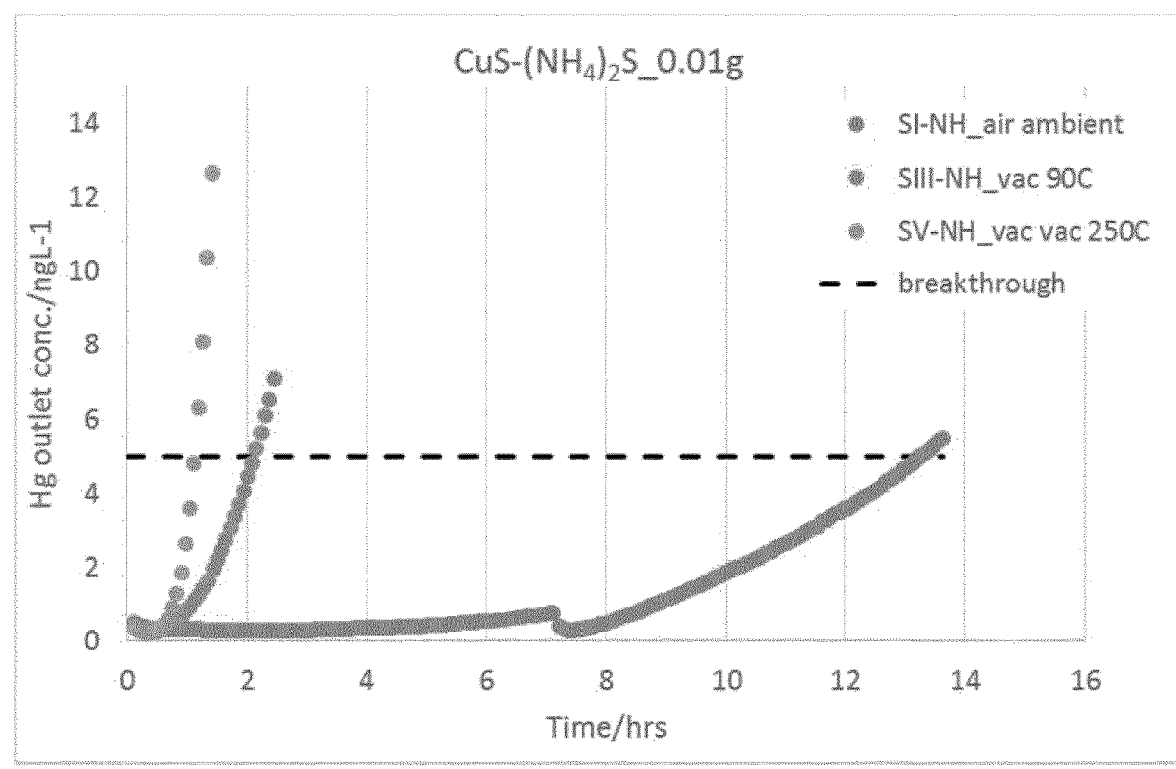
FIG. 3 is a graph of HG breakthrough plots for SI—NH, SIII—NH & SV—NH with reduced sample loading of 0.01 g.

FIG. 2 shows the mercury extraction performance results for the sample dried in air at ambient (SI—NH) followed by drying the same sample in air at 90° C. (SII—NH) and further heating at 250° C. in vacuum (SIV—NH). FIG. 3 shows the results for SI—NH, SIII—NH samples that are dried in vacuum at 90° C. and further heated at 250° C. that produced SV—NH. Comparing the results from FIGS. 2 and 3, SI—NH clearly outperforms other samples with breakthrough time of 13 hours which is consistent with the findings when tested at standard testing conditions using 0.03 g of sample in the fixed bed reactor (FIG. 9).

Figure 4:
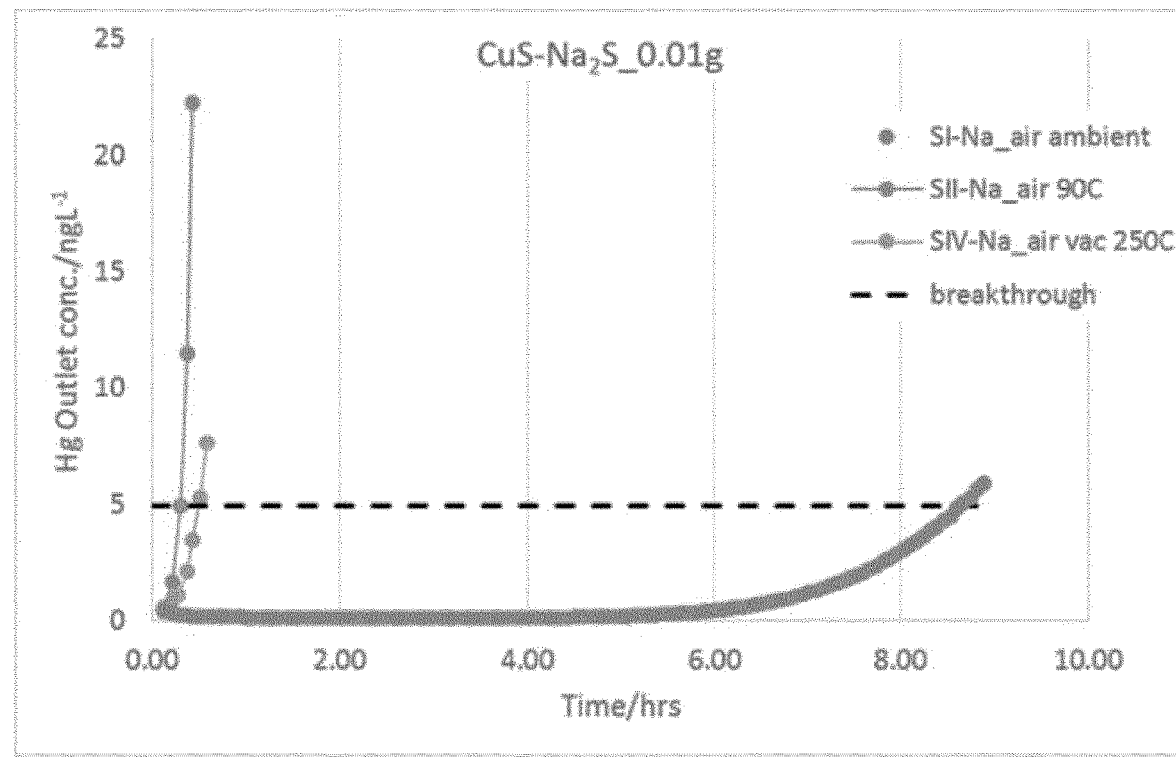
FIG. 4 is a graph of HG breakthrough plots for SI—Na, SII—NA & SIV—NA with reduced sample loading of 0.01 g.

FIG. 4 shows the mercury removal performance for samples SI—Na, SII—Na and SIV—Na that was conducted using 0.01 g sample loaded in the fixed bed reactor in order to further accelerate the breakthrough as discussed earlier. SI—Na sample (sample dried in ambient air) showed the highest performance amongst for SI—Na, SII—Na & SIV—Na with breakthrough time around 9 hours but this is still lower than the SI—NH sample that possessed 13 hours of breakthrough time.

Heating the sample in air at 90° C. significantly reduced the performance to 0.3 hours but further heating in vacuum at 250° C. has increased the performance slightly to 0.5 hours. The trend for mercury removal performance is the same as the sample prepared from $(NH_4)_2S$ but the magnitude is different since the sample prepared from $(NH_4)_2S$ has better performance. Sample drying in ambient air enhances the extraction performance in both cases.

Figure 5:
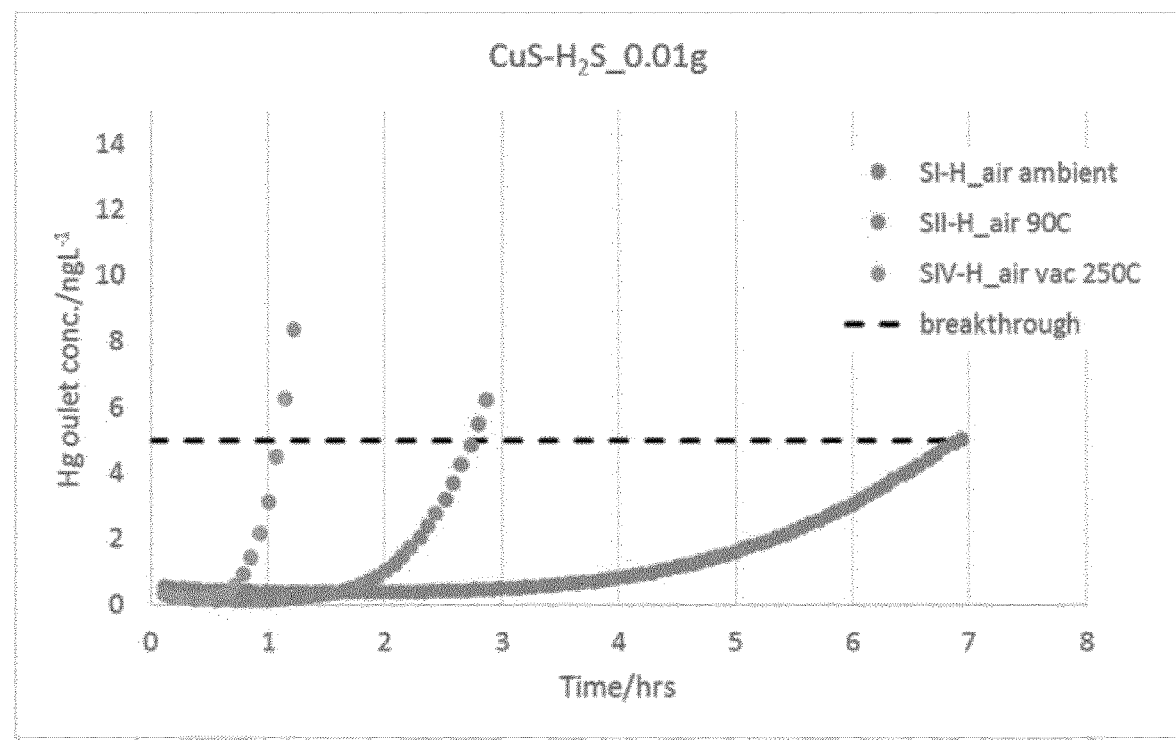
FIG. 5 is a graph of HG breakthrough plots for SI—H, SII—H & SIV—H with reduced sample loading of 0.01 g.

FIG. 5 shows the mercury removal performance for the SI—H, SII—H and SIV—H that was conducted using 0.01 g sample in the fixed bed reactor. SI—H sample which is the sample dried in ambient air showed the highest performance with around 7 hours breakthrough but this is lower from the SI—NH and SI—Na sample that provided 13 and 9 hours of elemental mercury extraction performance respectively. Heating the sample in air at 90° C. has reduced the performance to 2.7 hours and further heating in vacuum at 250° C. reduced the extraction performance to 1 hour. The trend for mercury removal performance is different from the sample prepared from $(NH_4)_2S$ and $Na_2S$ where for the case of sample from $(NH_4)_2S$ and $Na_2S$ heating in air at 90° C. reduced the performance significantly but further heating in vacuum at 250° C. has retrieved the performance to certain extent.

Figure 6:
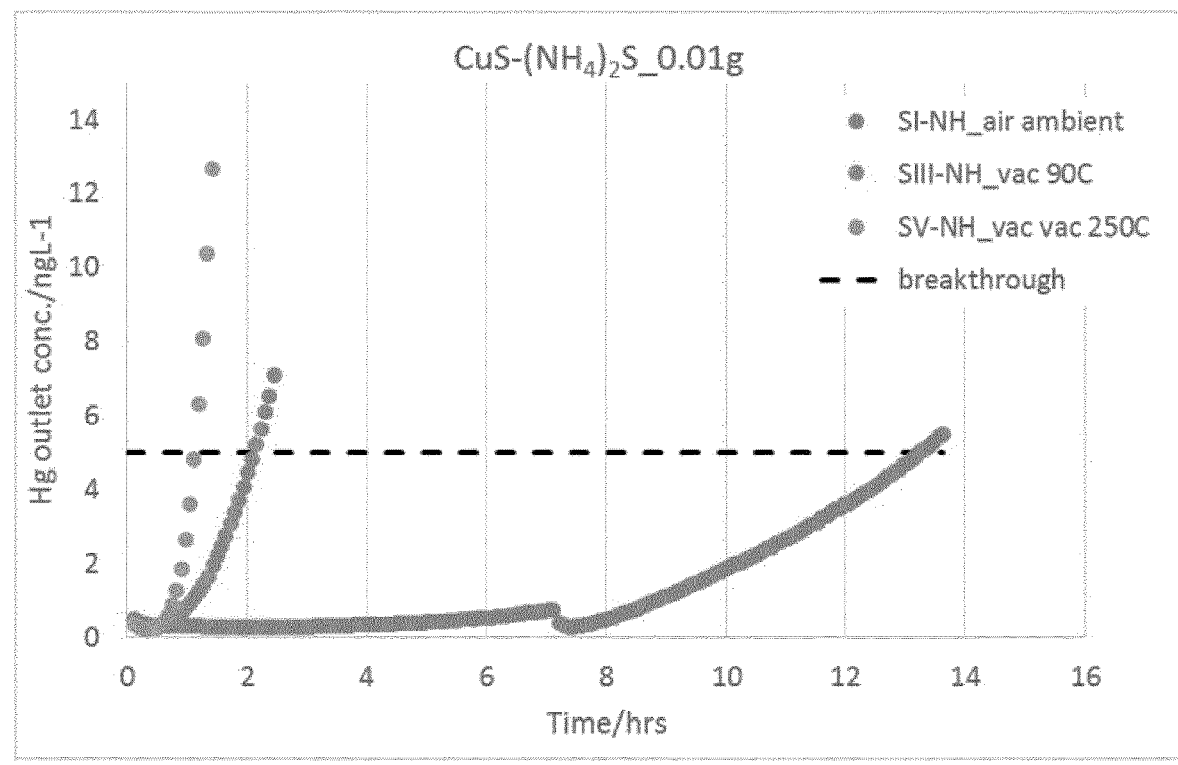
FIG. 6 is a graph of HG breakthrough plots for SI—NH, SIII—NH & SV—NH with a sample loading of 0.01 g.
Figure 7:
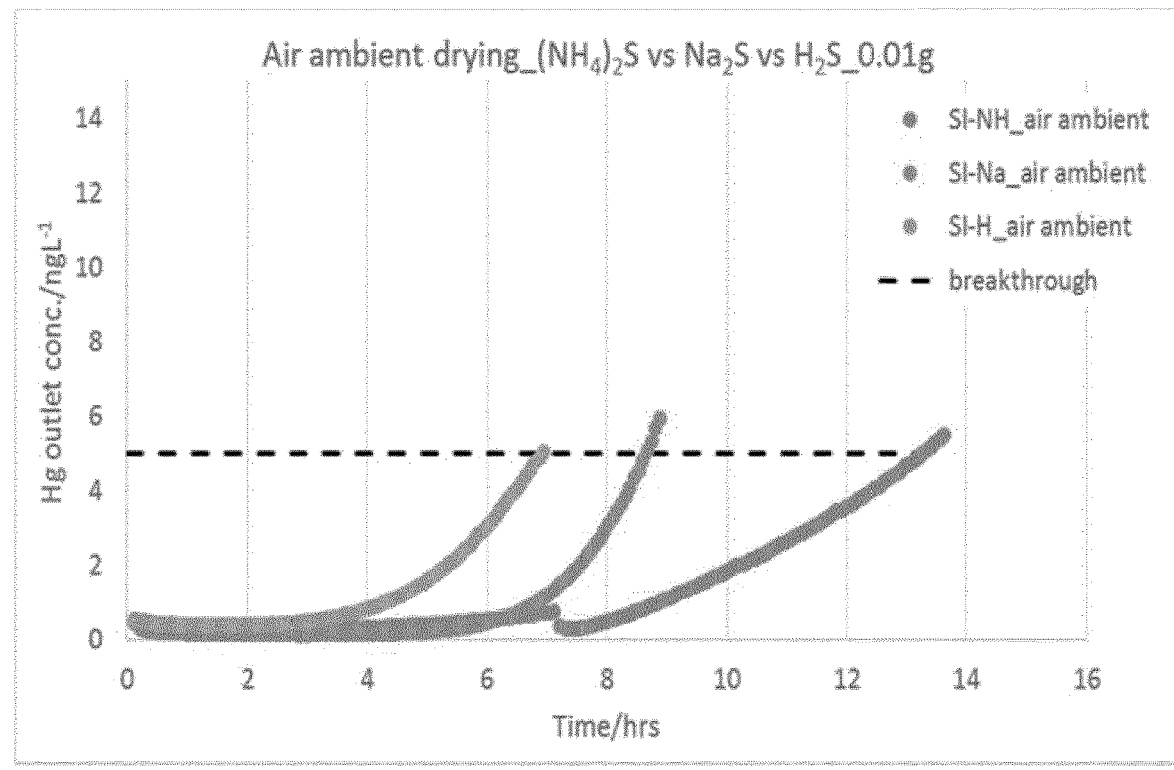
FIG. 7 is a graph of HG breakthrough plots for SI—NH, SI—NA & SI—H with sample loading of 0.01 g.
Figure 8:
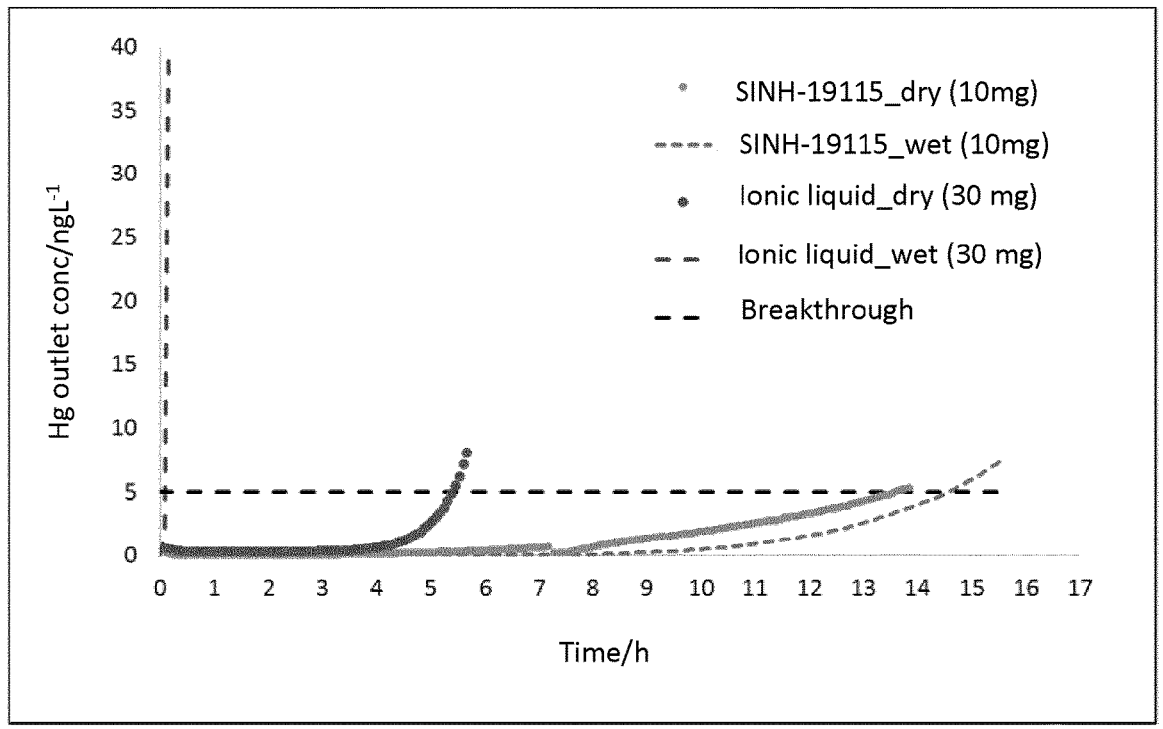
FIG. 8 is a graph of Elemental mercury breakthrough plots for SI—NH vs. a commercially equivalent mercury removal material based on ionic liquids under dry and wet conditions from gas phase using 600 ml/min, 2000 ng/L HG, variable sample weight using Sir Galahad II mercury analyser using nitrogen as the carrier gas.

As a summary, FIG. 6 shows mercury removal performance of the $Cu_xS_y$—$(NH_4)_2S$ samples using different drying techniques and FIG. 7 shows the performance of the air ambient drying samples for copper sulfide prepared using the sulfiding agents $(NH_4)_2S$, $Na_2S$ and $H_2S$.

Transmission Electron Microscopy (TEM) Studies

The following samples were analyzed by Transmission Electron Microscopy (TEM):

SI—NH (ammonium sulfide as sulfiding agent and air dried under ambient conditions);

SIII—NH (ammonium sulfide as sulfiding agent and vacuum dried at 90° C.);

Copper sulfide purchased from Sigma Aldrich;

SI—Na (sodium sulfide as sulfiding agent and air dried under ambient conditions);

SI—H (hydrogen sulfide as sulfiding agent and air dried under ambient conditions).

Figure 10:
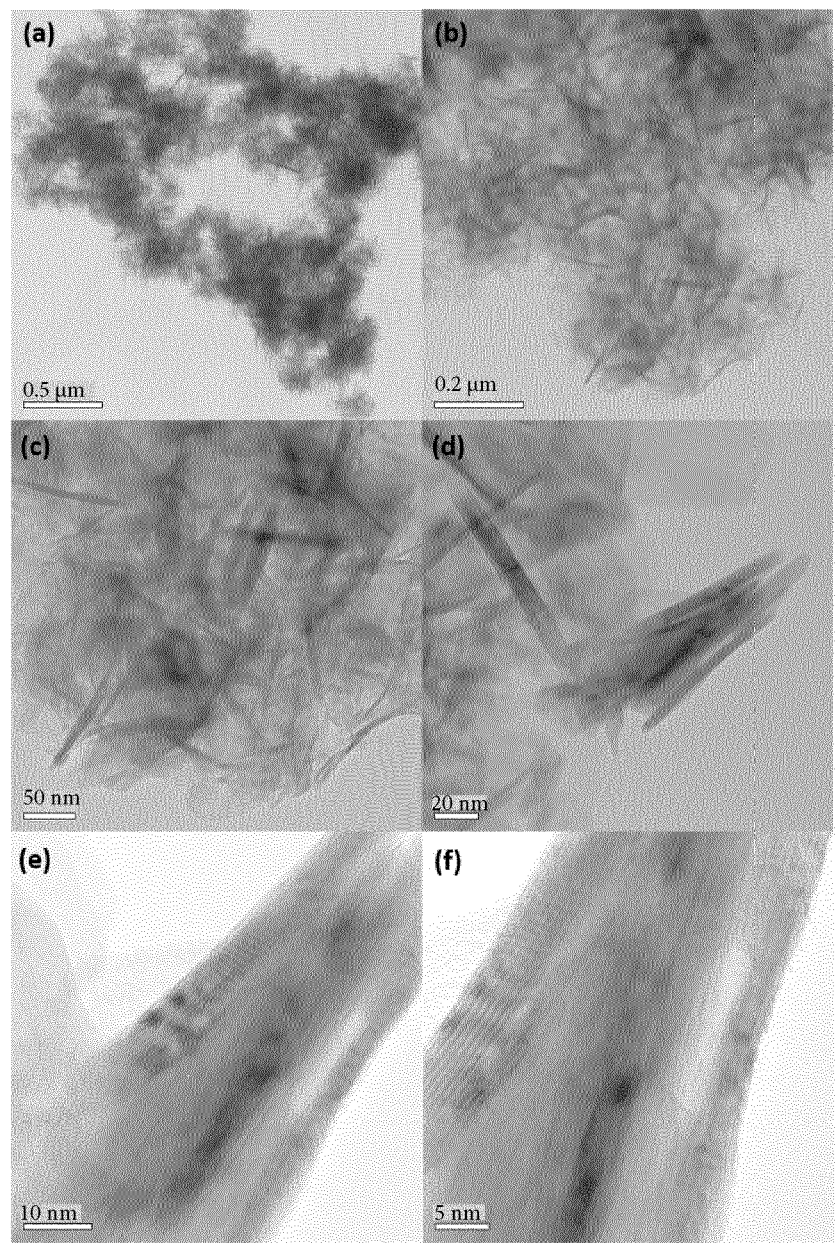
FIG. 10 is a TEM image of copper sulfide SI—NH described below in the examples.
Figure 11:
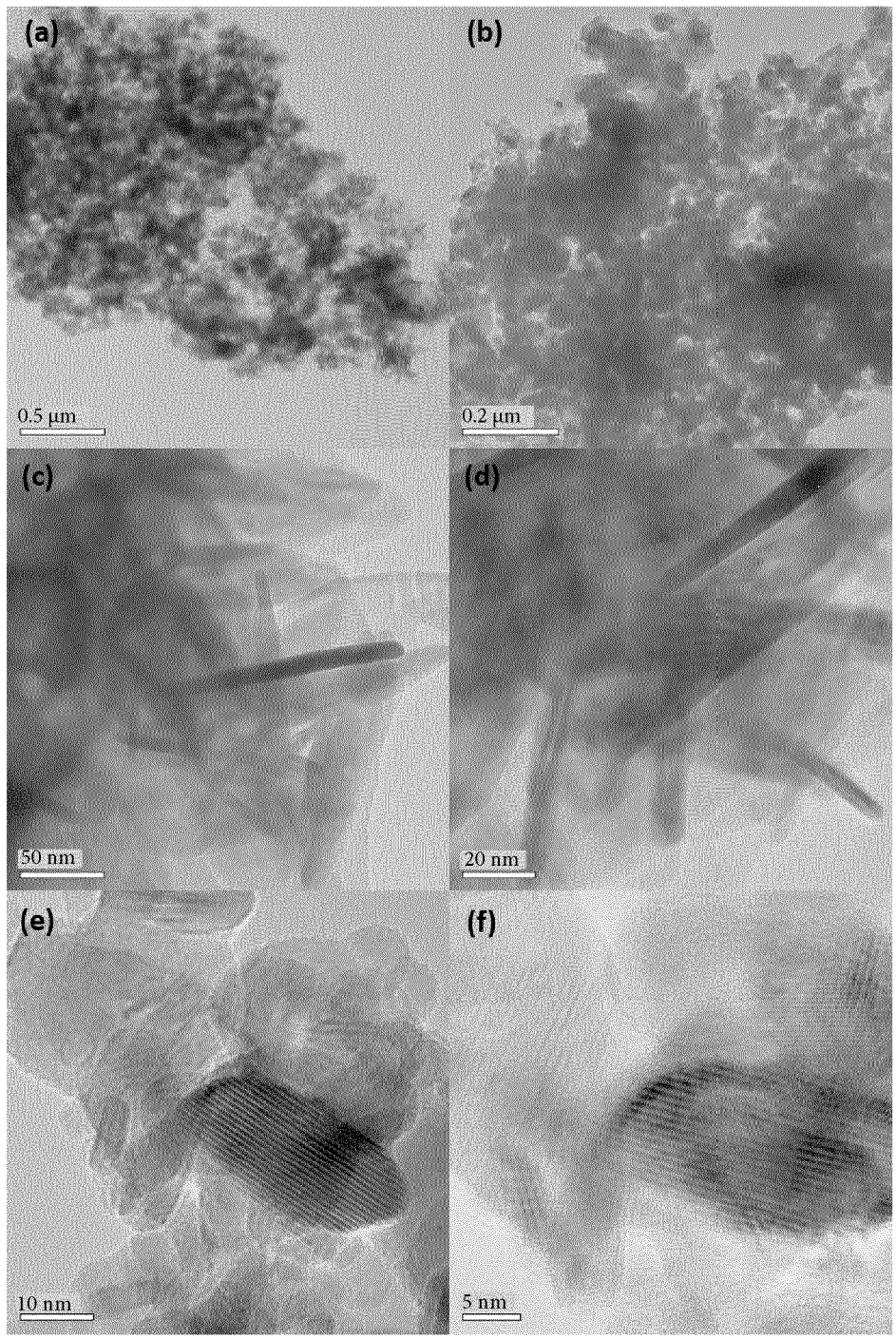
FIG. 11 is a TEM image of copper sulfide SIII—NH described below in the examples.
Figure 12:
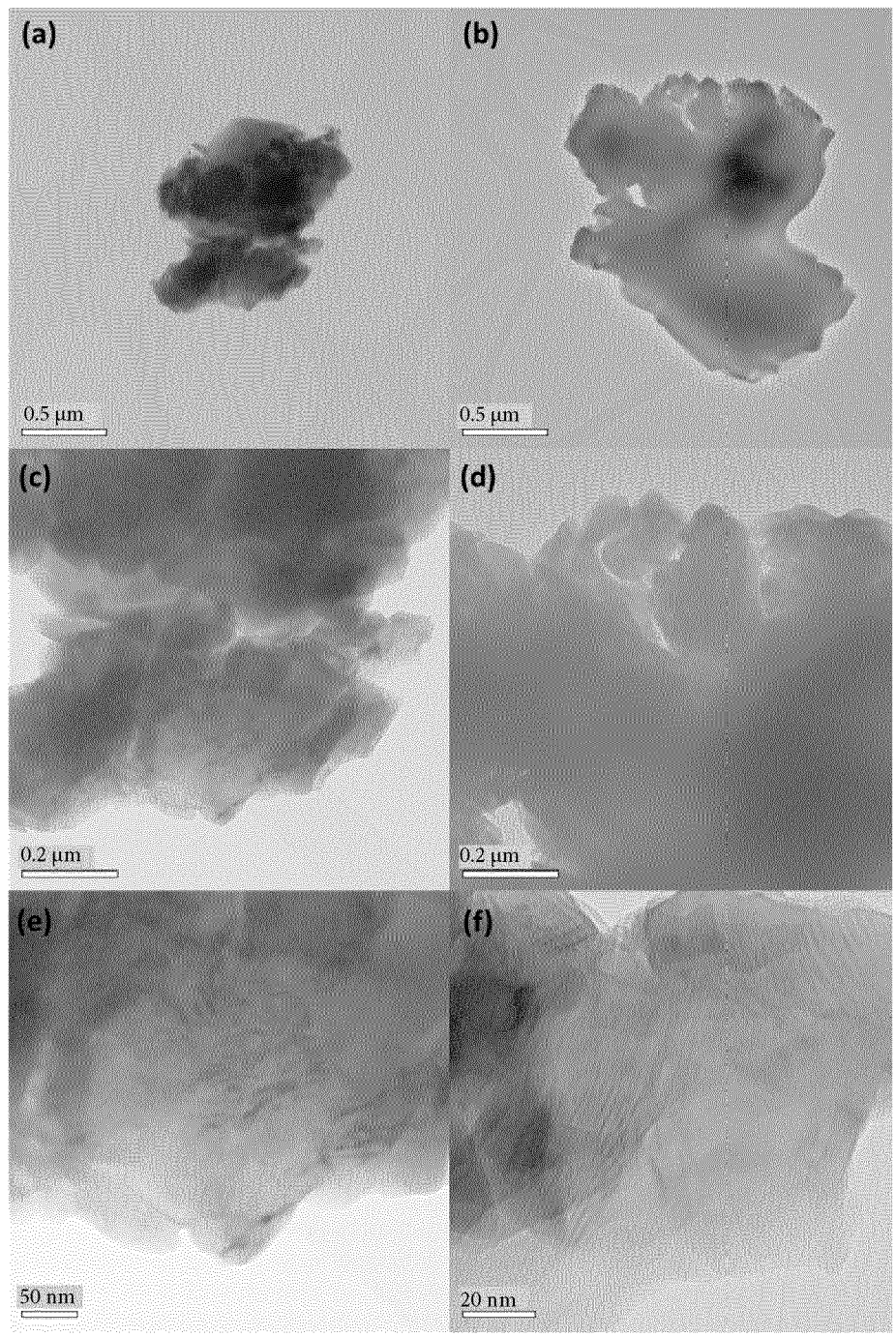
FIG. 12 is a group of TEM images at different resolutions of copper sulfide obtained from Sigma Aldrich.

From FIG. 10-FIG. 12, the difference can clearly be seen between the TEM images obtained for each of the samples. SI—NH (as shown in FIG. 10) can be seen to show a fine distribution of nano-crystalline particles (i.e. nano-needles) with the length of ~20-150 nm and diameter of ~10-20 nm. For SIII—NH sample which was dried at elevated temperature, 90° C. in vacuum (see FIG. 11), it can be seen that nano-crystalline particles have started to agglomerate, which might cause reduction in active sites. This can be correlated to the mercury removal performance of both samples, SI—NH vs SIII—NH, where SI—NH was tested to have a much better performance for mercury removal in comparison to SIII—NH, 13.5 vs 2 h.

Furthermore, TEM images for CuS-Sigma-Aldrich as can be seen in FIG. 12, showed that it is opaque due to bigger size particles. Therefore, it can be said that the heat treatment has transformed the sample from nano-crystalline particles that start to agglomerate on heating and become bigger sized, which is thought to have a direct impact on the mercury removal performance.

It has been shown that drying temperature affects the crystalline nature of the sample (i.e. nano-crystal transformed into macro or bigger crystal as temperature treatment increases), and how this has impacted the mercury removal performance. It would also be appropriate to compare the TEM analysis of samples that were produced using different sulfide sources (i.e. SI—NH, SI—NA and SI—H), and the TEM images can be seen in FIG. 13.

Figure 13:
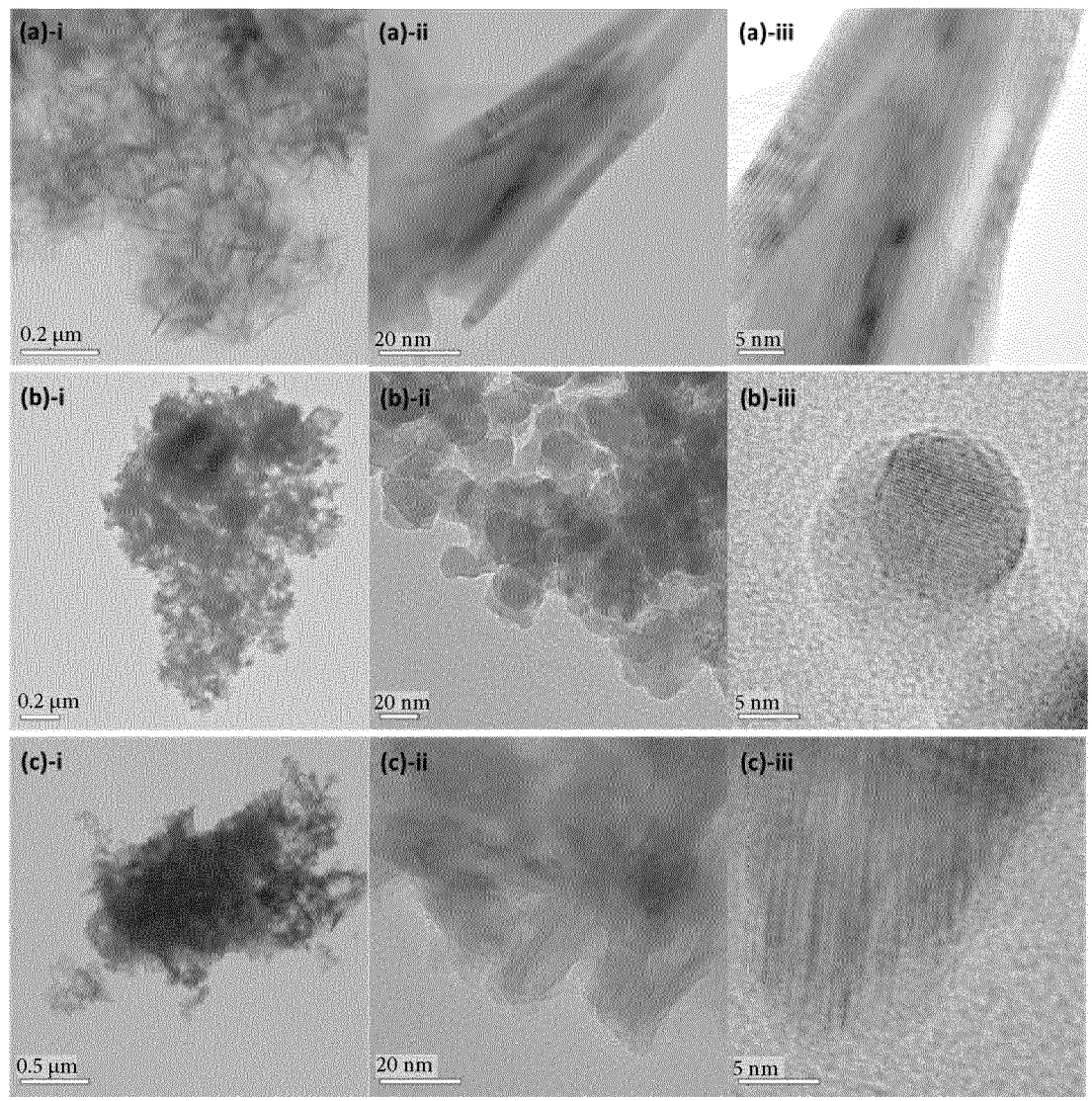
FIG. 13 is a group of TEM images at different Resolutions of a) SI—NH, b) SI—NH, and c) SI—H described below in the examples.

From FIG. 13, it can be seen that the agglomeration of particles increases, moving from SI—NH to SI—Na and finally to SI—H. For SI—Na, variable shapes of nano-crystalline particles were formed, and in the case of SI—H no specific shaped nano-crystallites were formed. These observations were also in line with the mercury removal performance, where mercury removal performance for SI—NH>SI—Na>SI—H. It can be said that temperature and sulfide sources influenced the formation of nano-crystallites that leads to well dispersed solid particles, and may account for the enhanced mercury extraction performance, with the best mercury removal performance being SI—NH.

FIG. 14 shows the difference in mercury breakthrough time between various copper sulfides produced according to the process of the present invention. The graph compares mercury breakthrough for copper sulfide produced from a process where copper chloride solution is added to a flask containing ammonium sulfide solution with copper sulfide produced from a process where the ammonium sulfide solution is added to a flask containing copper chloride solution. The graph also shows mercury breakthrough for copper sulfide obtained via a process of the invention where a copper chloride solution is simultaneous added to an ammonium sulfide solution. It can be seen that when a solution of copper chloride is added to a flask containing a solution of ammonium sulfide, the resultant copper sulfide has an enhanced mercury removal ability than vice versa and an enhanced mercury removal ability than simultaneous addition of the solutions.

It should be noted that whilst particle size of the copper sulfide is thought to increase the mercury removal performance of the copper sulfide, it is believed that this is not the sole reason for the enhanced mercury removal ability. Other factors are found to influence the mercury removal ability such as sulfiding agent, copper salt and sequence of addition of the reagents. Without being limited by theory, it is postulated that factors such as the oxidation states of the copper and sulfide ions in the new form of copper sulfide according to the invention may impact the mercury removal performance.

The invention claimed is:

1. A process for the removal of mercury from a mercury-containing hydrocarbon fluid stream comprising the steps of:
   (i) contacting the mercury-containing hydrocarbon fluid stream with a sorbent comprising copper sulfide of the formula $Cu_xS_y$, wherein x and y are integer or non-integer values; and
   (ii) separating a fluid product from the sorbent, wherein the fluid product has a reduced mercury content compared to the mercury-containing hydrocarbon fluid stream;
   wherein the copper sulfide is obtained or obtainable by a process comprising the following steps:
     (a) reacting an aqueous solution of a copper salt with a molar excess of a sulfiding agent so as to precipitate copper sulfide from the solution;
     (b) isolating the copper sulfide precipitate from the reaction mixture; and
     (c) drying the copper sulfide precipitate at a temperature of less than 100° C.

2. A process according to claim 1, wherein the copper salt and sulfiding agent are contacted in a ratio of from 1:1.01 to 1:1.5.

3. A process according to claim 1, wherein the molarity of the aqueous copper salt solution is from 0.1 M to 1.5 M.

4. A process according to claim 1, wherein the copper salt is a copper (II) salt.

5. A process according to claim 1, wherein the sulfiding agent comprises a sulfide salt.

6. A process according to claim 5, wherein the sulfide salt is dissolved in aqueous solution.

7. A process according to claim 1, wherein step i) comprises contacting the aqueous solution of copper salt with a molar excess of an aqueous solution of ammonium sulfide or sodium sulfide; stirring the reaction mixture for a period of time; before allowing the reaction mixture to stand for a period of time.

8. A process according to claim 1, wherein the step of (i) reacting the aqueous solution of a copper salt and sulfiding agent comprises adding the aqueous copper salt solution to a container comprising an aqueous solution of a sulfiding agent.

9. A process according to claim 1, wherein the copper salt comprises copper (II) chloride and the sulfiding agent comprises ammonium sulfide or sodium sulfide.

10. A process according to claim 1, wherein the reaction mixture is stirred for a time period of from 10 minutes to 30 minutes.

11. A process according to claim 1, wherein the reaction mixture is allowed to stand for a time period of from 5 minutes to 60 minutes.

12. A process according to claim 1, wherein the sulfiding agent comprises hydrogen sulfide gas.

13. A process according to claim 12, wherein the hydrogen sulfide gas is mixed with nitrogen, and is present in said nitrogen in an amount of from 50 ppm to 250 ppm nitrogen.

14. A process according to claim 1, wherein step (ii) of isolating the copper sulfide from the reaction mixture comprises filtering the copper sulfide precipitate from the reaction mixture.

15. A process according to claim 1, wherein step (iii) of drying the copper sulfide precipitate comprises drying the precipitate for a time period of less than 48 hours.

16. A process according to claim 1, wherein step (iii) of drying the copper sulfide precipitate comprises drying the precipitate in vacuum at a temperature of less than 100° C.

17. A process according to claim 1, wherein step (iii) of drying the copper sulfide precipitate comprises drying the precipitate in air at a temperature of less than 70° C.

18. A process according to claim 1, wherein step (iii) of drying the copper sulfide precipitate comprises drying the precipitate at a temperature of above 15° C.

19. A process according to claim 1, wherein the process is carried out in the presence or absence of one or more support materials or one or more binder materials.

20. A process according to claim 1, wherein the mercury is in elemental, particulate, or organic form.

21. A process according to claim 1, wherein the mercury concentration in the mercury-containing hydrocarbon fluid stream is in the range of from 1 to 2000 parts per million (ppm).

22. A process according to claim 1, wherein the mercury-containing hydrocarbon fluid stream is a liquid, one or more of:
 (i) a liquefied natural gas;
 (ii) a light distillate comprising liquid petroleum gas, gasoline, and/or naphtha;
 (iii) a natural gas condensate;
 (iv) a middle distillate comprising kerosene and/or diesel;
 (v) a heavy distillate; and
 (vi) a crude oil.

23. A process according to claim 1, wherein the mercury-containing hydrocarbon fluid stream comprises natural gas and/or refinery gas.

24. A process according to claim 23, wherein the mercury-containing hydrocarbon fluid feed comprises wet natural gas or dry natural gas.

25. A process according to claim 1, wherein the sorbent comprising copper sulfide and mercury-containing hydrocarbon fluid stream are contacted at a temperature of from 0° C. to 200° C.

26. A process according to claim 1, wherein sorbent comprising copper sulfide and mercury-containing hydrocarbon fluid stream are contacted at a pressure of from 0 to 10,000 KPa.

27. A process according to claim 1, wherein the mercury-containing hydrocarbon fluid stream and sorbent comprising copper sulfide are contacted for a period of up to 5 hours.

* * * * *